United States Patent [19]

Ruehl et al.

[11] Patent Number: 5,487,219

[45] Date of Patent: Jan. 30, 1996

[54] METHOD OF MANUFACTURING ENGINE CRADLES

[75] Inventors: Phillip C. Ruehl, Elm Grove; Stephen L. Kretschmer, Mequon; Richard J. Behrmann, Colgate, all of Wis.

[73] Assignee: A. O. Smith Corporation, Milwaukee, Wis.

[21] Appl. No.: 110,031

[22] Filed: Aug. 20, 1993

[51] Int. Cl.⁶ .............................. B23P 11/00; B21D 39/00
[52] U.S. Cl. ................................ 29/897; 29/465; 29/521; 29/524; 29/897.2
[58] Field of Search ................... 29/465, 521, 522.1, 29/524, 897, 897.2, 897.31, 897.312, 897.35; 72/363, 397.2, 348

[56] References Cited

U.S. PATENT DOCUMENTS

| | | |
|---|---|---|
| 2,007,898 | 7/1935 | Ragsdale . |
| 2,125,692 | 8/1938 | Ragsdale et al. .................. 29/897.35 |
| 2,330,602 | 9/1943 | Tourneau . |
| 2,430,437 | 11/1947 | Trautretter . |
| 2,683,927 | 7/1954 | Maronek ................................. 29/521 |
| 2,869,228 | 1/1959 | Martin . |
| 3,037,271 | 6/1962 | Schilberg ................................ 29/415 |
| 3,359,935 | 12/1967 | Rosbottom . |
| 3,579,809 | 5/1971 | Wolf et al. ............................. 29/509 |
| 3,925,875 | 12/1975 | Doke ................................. 29/521 X |
| 4,131,980 | 1/1979 | Zinnbauer . |
| 4,621,661 | 11/1986 | Greiner ................................. 138/172 |
| 4,730,870 | 3/1988 | DeRees . |
| 4,752,993 | 6/1988 | Oaks .................................. 29/521 X |
| 5,195,580 | 3/1993 | Hoeffken ............................ 29/521 X |

FOREIGN PATENT DOCUMENTS

| | | |
|---|---|---|
| 640972 | 7/1928 | France . |
| 647170 | 8/1980 | Switzerland . |
| 1253378 | 11/1971 | United Kingdom . |
| 1502688 | 3/1978 | United Kingdom . |
| 2270706 | 3/1994 | United Kingdom . |

*Primary Examiner*—S. Thomas Hughes
*Attorney, Agent, or Firm*—James E. Lowe, Jr.; David R. Price

[57] ABSTRACT

A method for forming a structural member, the method comprising the steps of placing a first sheet member having a length dimension greater than a width dimension in a press, placing a second sheet member having a length dimension greater than a width dimension in the press, the second member only partially overlapping the first member, the first member only partially overlapping the second member, and the direction of the length dimension of the second member being angled relative to the direction of the length dimension of the first member, and closing the press to shape the first member and the second member.

38 Claims, 5 Drawing Sheets

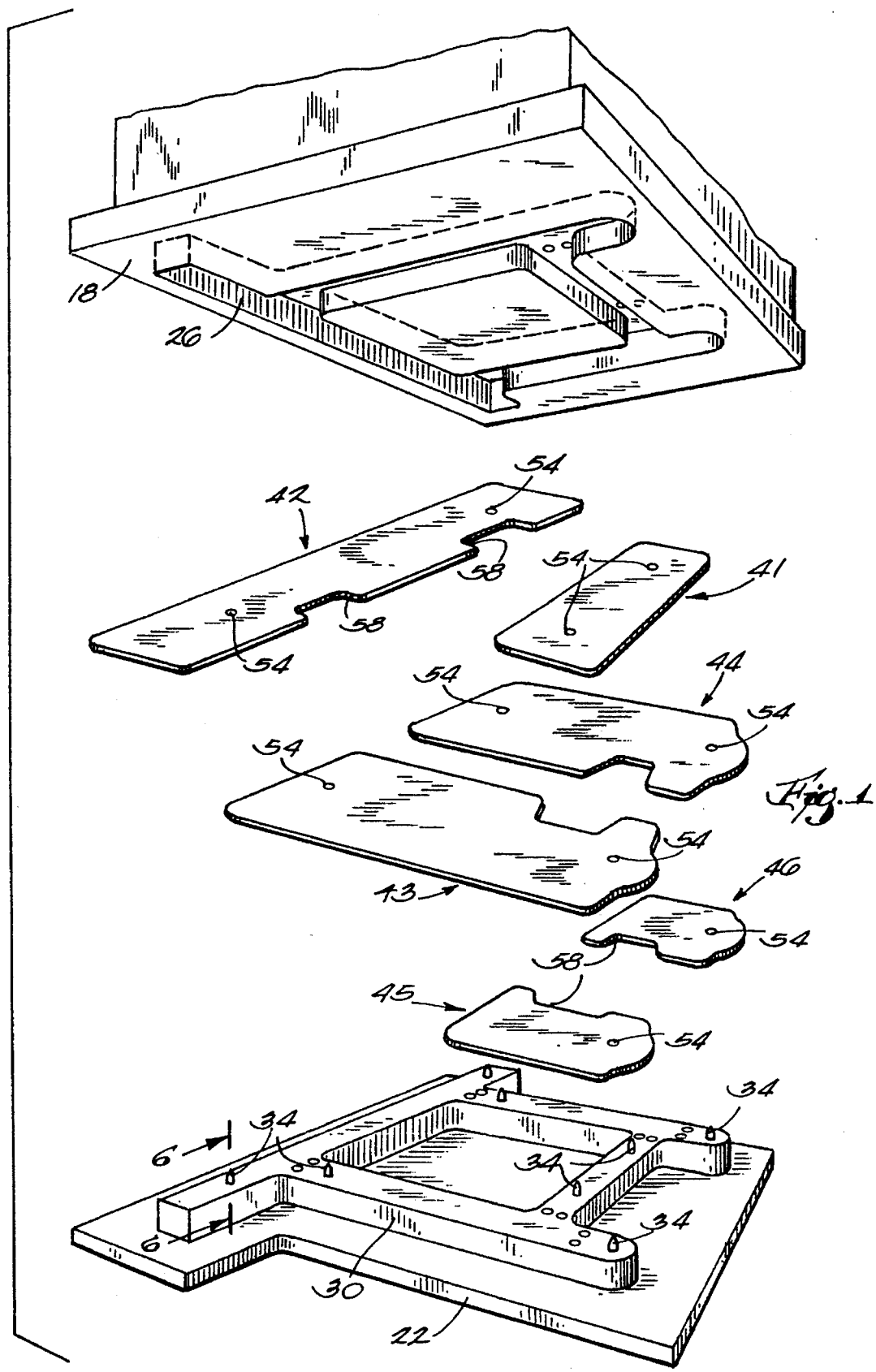

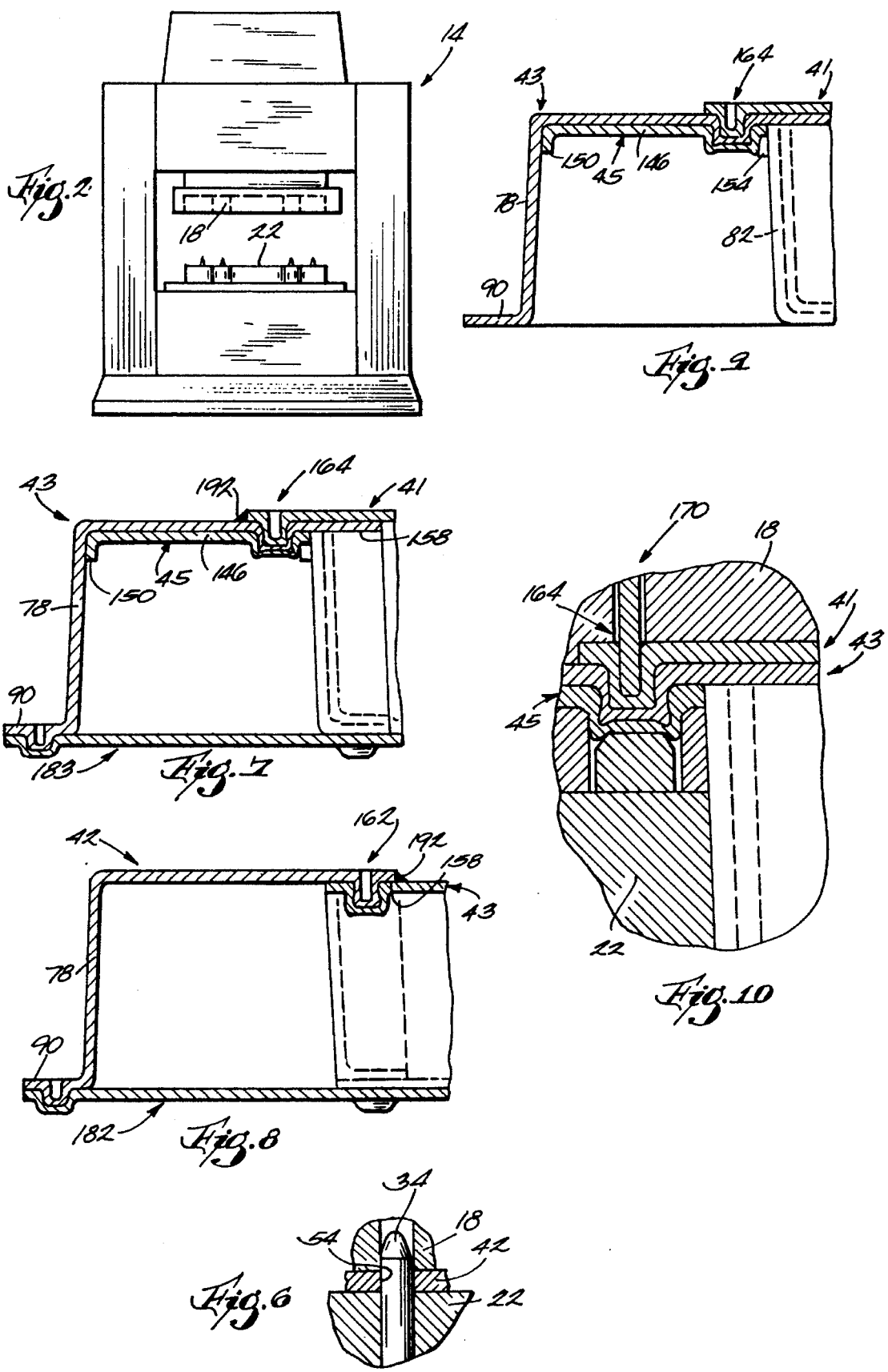

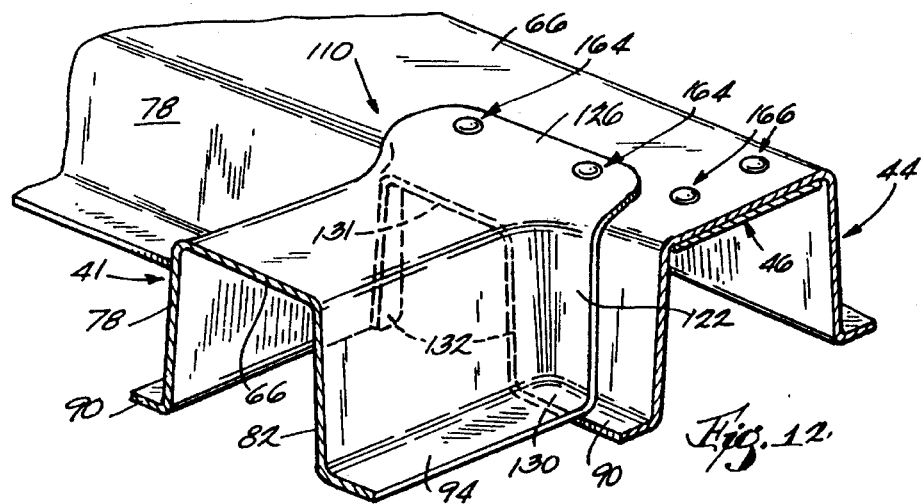

5,487,219

METHOD OF MANUFACTURING ENGINE CRADLES

BACKGROUND OF THE INVENTION

The invention relates to structural members and to methods of manufacturing structural members. More particularly, the invention relates to structural frames for motor vehicles, as well as other vehicle structural elements, such as control arms and door panels. Still more particularly, the invention relates to engine cradles for passenger vehicles.

A typical engine cradle for a passenger vehicle comprises four structural frame members welded together to define a generally rectangular opening. Each structural member has a box-like cross section. The box-like section can be made, for example, by welding a pair of U-shaped members together.

Known methods of manufacturing engine cradles require a substantial capital investment and substantial manpower. It is also very difficult to control tolerances on the various cradle parts because of the significant number of operations required to make the cradle. The tolerances of each of these sequential operations may stack to cause large dimensional discrepancies in the finished assembly.

SUMMARY OF THE INVENTION

The invention provides an improved method of manufacturing structural members and structural frame members. More particularly, the invention provides an improved method of manufacturing engine cradles for passenger vehicles. The invention also provides improved structural members and an improved engine cradle for passenger vehicles.

Preferably, four elongated sheet metal blanks are formed and punchlocked together with a single stroke of a stamping press. The sheet metal blanks, which will be referred to as "top sheets," are placed in the press with first and second sheets parallel and spaced apart. A third sheet is located with one end overlapping a portion of the first sheet and with the opposite end overlapping a portion of the second sheet. The fourth sheet is placed in the press with one end overlapping a portion of the first sheet and with the opposite end overlapping a portion of the second sheet. The fourth sheet is parallel to and spaced from the third sheet, so that the four top sheets define a rectangle. A first reinforcement blank is placed below the overlapping portions of the first and third sheets, and extends aft to give doubled metal stock at the rear body mount, and a second reinforcement blank is placed below the overlapping portions of the second and third sheets, and is similarly extended. The press is then closed so that the top sheets and the reinforcement blanks are formed and secured together with a single press stroke.

Each of the four top sheets is formed in this first press operation so as to have a hat-shaped cross section with a generally horizontal top wall, generally vertical side walls extending downwardly from the opposite edges of the top wall, and generally horizontal flanges extending outwardly from the bottom edges of the side walls. A joint is formed between two formed top sheets at each point where the sheets overlap. Two of the joints are formed by integral extensions of the side walls of one of the connected sheets being bent outwardly and overlapping the side walls of the other sheet, by an integral extension of the top wall of the one sheet overlapping the top wall of the other sheet, by spaced integral extensions of the side wall of the other sheet being bent outwardly and extending inside the side walls of the one sheet, and by an integral extension of the top wall of the other sheet extending beneath the top wall of the one sheet. The connected sheets are secured together by friction from coincident forming and punch-locks in the overlapping top wall extensions. The other two joints are formed by integral extensions of the side wall of one sheet being bent outwardly and overlapping the ends of the side walls of the other sheet, by an integral extension of the top wall of the one sheet overlapping the top wall of the other sheet, and by integral extensions of one flange of the one sheet overlapping the flanges of the other sheet. The first and second top sheets are also punch-locked to the respective reinforcement blanks.

Next, the assembly of the four top sheets and the reinforcement blanks (the "first operation assembly") is placed, along with four additional sheet metal blanks which will be referred to as "closing sheets," in either a second press or the same press with a different die. Each closing sheet is shaped so as to be co-extensive with the underside of a respective one of the formed top sheets. The four closing sheets are placed in the second die in substantially the same orientation as were the four top sheets. The first operation assembly is then placed over the four closing sheets so that the flanges of each formed top sheet rest on a respective one of the closing sheets. The press is then closed so as to punch-lock the flanges of each formed top sheet to the underlying closing sheet. The result is a structural frame with four box-like members defining a rectangular or trapezoidal opening.

After the two press operations, the frame is taken to a final assembly fixture where critical joints are welded and brackets are attached. Preferably, joints between overlapping top sheets and joints between overlapping closing sheets are arc welded.

A principal feature of the invention is the provision of a manufacturing method that requires substantially less manpower, substantially less capital investment and substantially less floor space than conventional methods. For example, while a conventional method requires 10 die lines, 30 press strokes, 15 operators and 14,000 square feet to manufacture a particular engine cradle from blanks to the final assembly fixture, the method of the invention requires two press strokes, four operators and 1,200 square feet to similarly manufacture an equivalent engine cradle. A variation of the later can use automatic blank and part feed to eliminate all of the direct labor, while using 1,500 square feet of space, and the same two press strokes. The result is an engine cradle that is significantly less expensive to manufacture.

Also, prior art methods required major structural components to be aligned while being welded. This involves a stacking of the tolerances of the 10 detail parts and then of some 4 sub-assemblies. This can make it difficult to maintain tolerances. In the method of the invention, the major structural components are secured together by the die before welding. Tolerances are therefore virtually as good as the die. Lap welds can then be completed on mating surfaces which are in intimate contact as a result of the forming process. In other words, there would be no weld gaps.

Conventional methods also frequently rely on post assembly operations to precisely produce, such as by post pierce operations, holes in the structural member for attaching vehicle components to the member. In the invention, needed holes can be placed in the sheet members prior to assembly, or formed in the structural member in the second stage of a two stage press, thereby eliminating the need to have post pierce operations.

Other features and advantages of the invention will become apparent to those skilled in the art upon review of the following detailed description, claims and drawings.

DESCRIPTION OF THE DRAWINGS

FIG. 1 is an exploded perspective view of upper and lower die halves and six sheet metal blanks employed in a first press operation in accordance with the invention.

FIG. 2 is an elevational view of a press utilizing the upper and lower die halves.

FIG. 6 is a view taken along line 6—6 in FIG. 1.

FIG. 7 is a view taken along line 7—7 in FIG. 5.

FIG. 8 is a view taken along line 8—8 in FIG. 5.

FIG. 9 is a view taken along line 9—9 in FIG. 4.

FIG. 10 is an enlarged sectional view showing three blanks being punched locked in the first press operation.

FIG. 11 is a view taken along line 11—11 in FIG. 4.

FIG. 12 is an enlarged partial perspective view of the assembly formed by the first press operation.

FIG. 14 is a partial perspective view of an engine cradle that is an alternative embodiment of the invention.

Figure 15:
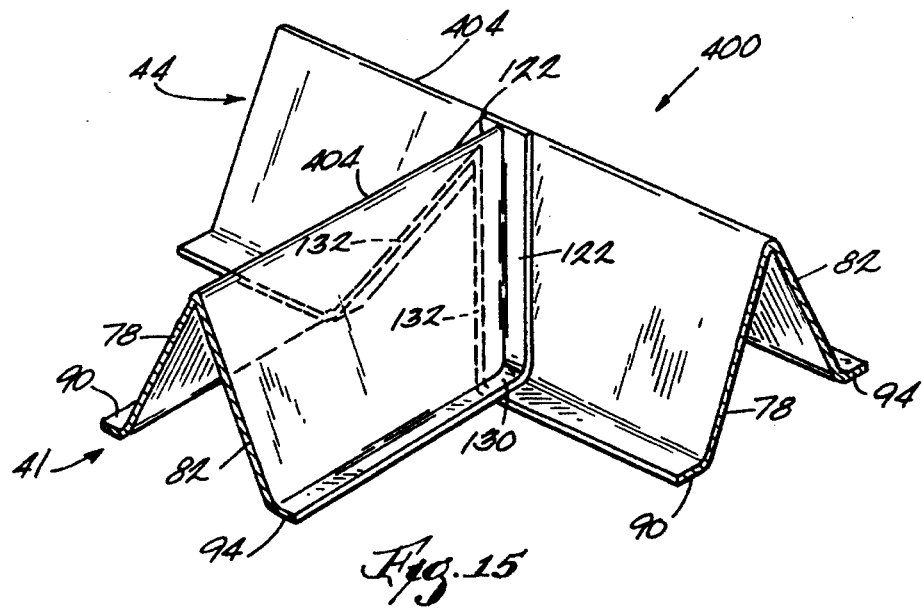
FIG. 15 is a partial perspective view of an engine cradle that is another alternative embodiment of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Figure 5:
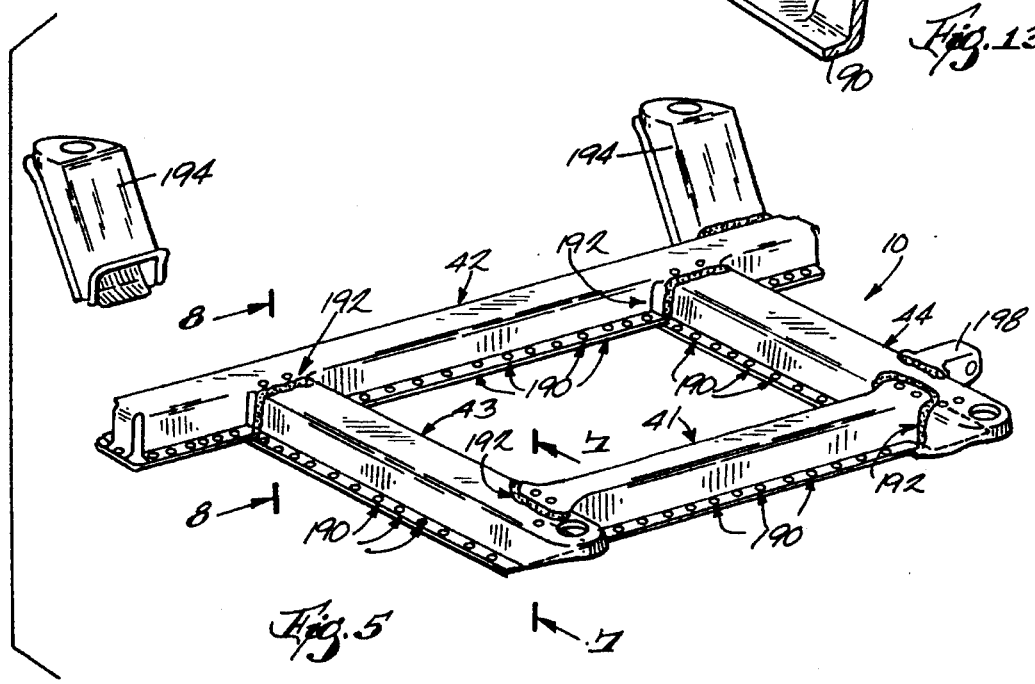
FIG. 5 is an exploded perspective view of the blanks shown in FIG. 4 after the second press operation and after arc welding of critical joints, along with additional brackets.

A structural member such as an engine cradle 10 (see FIG. 5) is manufactured as follows in accordance with the invention. A stamping press 14 employed in the manufacturing process is illustrated in FIG. 2. The press 14 itself is conventional and will not be described in detail. As is known in the art, the press 14 can be closed to move upper and lower die halves 18 and 22 together.

The die halves 18 and 22 are illustrated in greater detail in FIG. 1. The upper die half 18 has therein a recess 26, and the lower die half 22 has thereon a complementary projection 30. The projection 30 has thereon (see FIGS. 1 and 6) pins 34 which, as is known in the art, move into recesses (not shown) in the upper die half 18 when the press 14 is closed so as to orient blanks on the lower die half 22, as will be explained hereinafter.

Figure 3:
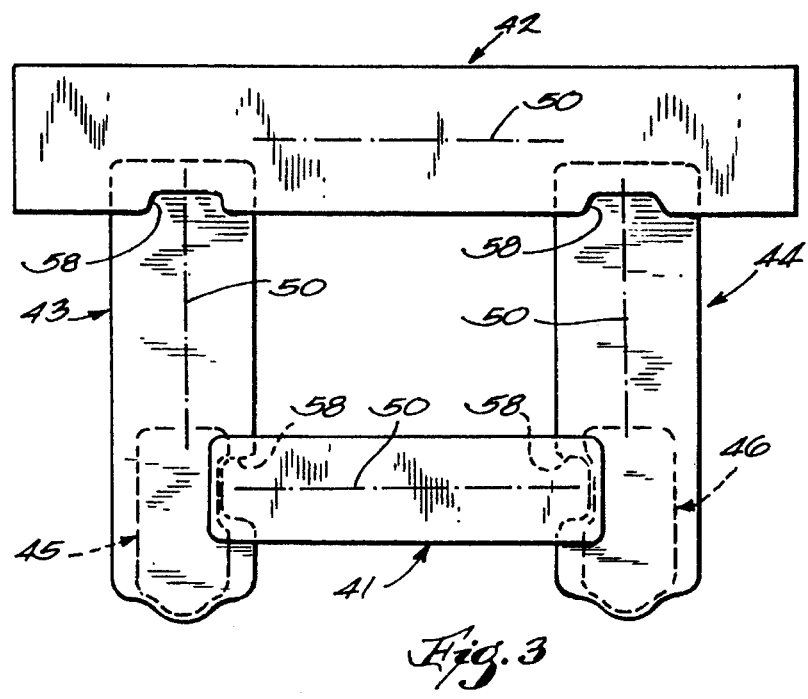
FIG. 3 is a top plan view of the blanks properly arranged for forming in the first press operation.

As shown in FIGS. 1 and 3, six sheet metal blanks or members 41, 42, 43, 44, 45 and 46 are placed on the lower die half 22. The blanks 41, 42, 43 and 44 are elongated and are referred to hereinafter as "top sheets." By "elongated" it is meant that each top sheet 41, 42, 43 or 44 has (see FIG. 3) a longitudinal axis 50 and a maximum length dimension greater than its maximum width dimension. The sheets 41 and 42 are generally parallel and spaced apart, and the sheets 43 and 44 are generally parallel and spaced apart. Thus, the longitudinal axes 50 of the sheets 41 and 42 are transverse to the longitudinal axes 50 of the sheets 43 and 44. In other words, the length dimensions of the sheets 41 and 42 are angled relative to the length dimensions of the sheets 43 and 44. The axes 50 of the sheets 41 and 42 are preferably perpendicular to the axes 50 of the sheets 43 and 44. As best shown in FIG. 3, one end of the sheet 41 partially overlaps the sheet 43, the opposite end of the sheet 41 partially overlaps the sheet 44, and spaced portions of the sheet 42 partially overlap ends of the sheets 43 and 44. It should be noted that none of the sheets 41, 42, 43 and 44 is completely overlapped by another sheet.

The blanks 45 and 46, referred to hereinafter as "reinforcement blanks," are also placed on the lower die half 22. The reinforcement blank 45 is located beneath an end of the sheet 43, and the reinforcement blank 46 is located beneath an end of the sheet 44.

Each of the top sheets 41, 42, 43 and 44 and each of the reinforcement blanks 45 and 46 has there through (see FIG. 1) one or more apertures 54. Each aperture 54 receives (see FIG. 6) a respective pin 34 on the lower die half 22. The pins 34 orient the top sheets 41, 42, 43 and 44 and reinforcement blanks 45 and 46 relative to the die half 22, as is known in the art. One edge of the sheet 42 has therein (see FIG. 1) spaced indentations 58, and one edge of each of the sheets 43 and 44 and the reinforcement blanks 45 and 46 has therein an indentation 58. The reason for the indentations 58 is explained below.

Figure 4:
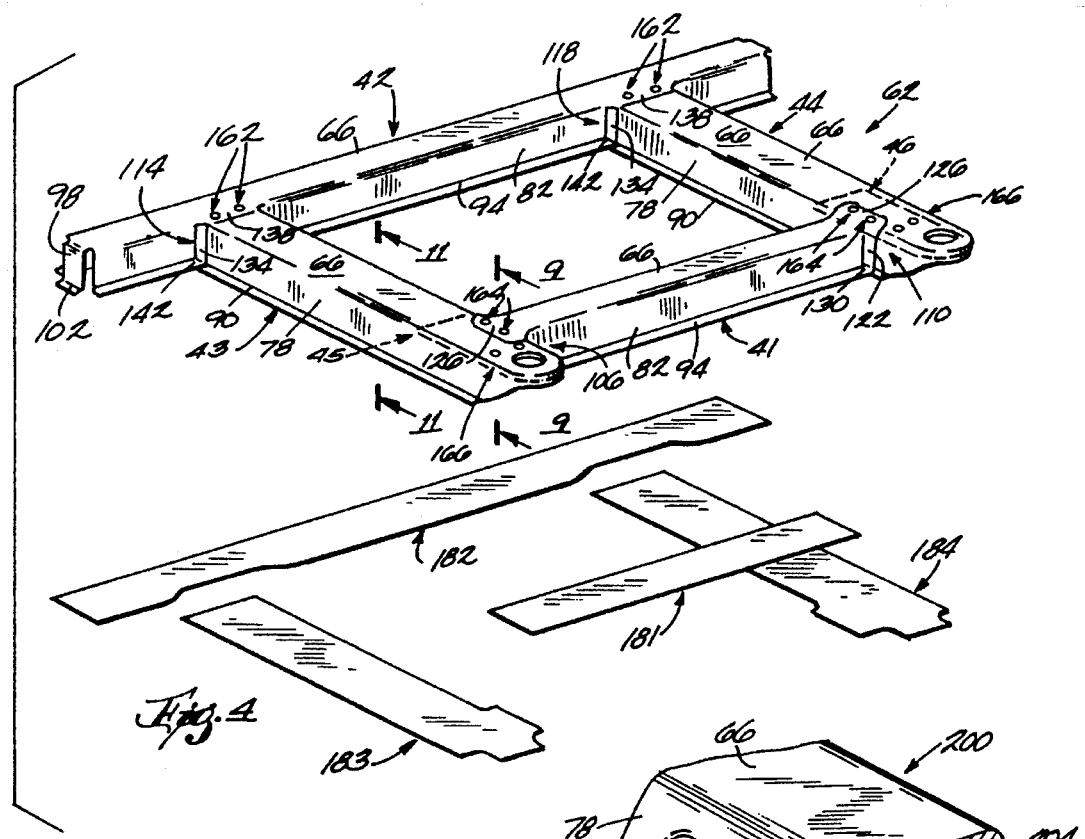
FIG. 4 is an exploded perspective view of the formed and joined blanks after the first press operation along with four closing sheet blanks employed in a second press operation.

After the top sheets 41, 42, 43 and 44 and the reinforcement blanks 45 and 46 are properly located on the lower die half 22, the press 14 is closed. Closing of the press 14 forms the top sheets 41, 42, 43 and 44 and the reinforcement blanks 45 and 46 into an assembly 62 that is illustrated in FIG. 4. More particularly, each of the top sheets 41, 42, 43 and 44 is formed so as to have a hat-shaped cross section along substantially the entire length thereof. The cross sections of the sheets 41, 42, 43 and 44 are substantially identical, and only the cross section of the sheet 43 will be described in detail.

The hat-shaped cross section of the sheet 43 is illustrated in FIG. 11. The top sheet 43 is formed so as to have a generally planar top wall 66 with opposite edges 70 and 74 extending parallel to the longitudinal axis 50 of the formed sheet. The sheet 43 also has a generally planar side wall 78 extending downwardly from the edge 70 of the top wall 66, and a generally planar side wall 82 extending downwardly from the opposite edge 74 of the top wall 66. The side walls 78 and 82 are generally perpendicular to the top wall 66, although the side walls 78 and 82 preferably diverge slightly, as shown in FIG. 11. Each of the side walls 78 and 82 has a lower edge 86. The top sheet 43 also has a flange 90 extending outwardly from the lower edge 86 of the side wall 78, and a flange 94 extending outwardly from the lower edge 86 of the side wall 82. The flanges 90 and 94 are generally co-planar and parallel to the top wall 66.

As shown in FIG. 4, the sheet 42 is also formed to have an end wall 98 extending downwardly from one end of the top wall 66, and an end wall (not shown) extending downwardly from the opposite end of the top wall 66. The lower end of each end wall 98 has thereon an outwardly extending flange 102.

Closing of the press 14 forms (see FIG. 4) a joint 106 between the formed sheets 41 and 43, a joint 110 between the formed sheets 41 and 44, a joint 114 between the formed sheets 42 and 43, and a joint 118 between the formed sheets 42 and 44.

At the joints 106 and 110, as shown in FIGS. 4 and 12, integral extensions 122 of the side walls 78 and 82 of the sheet 41 are bent outwardly and overlap side walls of the sheets 43 and 44, integral extensions 126 of the top wall 66 of the sheet 41 overlap the top walls 66 of the sheets 43 and 44, and integral extensions 130 (only one is shown) of the flanges 90 and 94 of the sheet 41 overlap flanges of the sheets 43 and 44. Additionally, referring to FIG. 12 in which the joint 110 is shown, an integral extension 131 of the top wall 66 of the sheet 44 extends beneath the top wall of the sheet 41, and integral extensions 132 of the side wall 78 of the sheet 44 are bent outwardly and extend generally perpendicular to the side wall 78 of the sheet 44 and inside the side walls 78 and 82 of the sheet 41. The joint 106 is similarly formed and will not be described in detail.

At the joints 114 and 118 (see FIG. 4), integral extensions 134 (two are shown) of the side wall 82 of the sheet 42 are bent outwardly and overlap the ends of the side walls of the sheets 43 and 44, integral extensions 138 of the top wall 66 of the sheet 42 overlap the top walls 66 of the sheets 43 and 44, and integral extensions 142 (two are shown) of the flange 94 of the sheet 42 overlap the flanges of the sheets 43 and 44.

Closing of the press 14 forms each of the reinforcement blanks 45 and 46 into an inverted U-shape, as best shown in FIG. 9, with each reinforcement blank having a top wall 146 abutting the underside of the top wall 66 of the associated top sheet, a downwardly extending flange 150 abutting the inside of one side wall of the associated top sheet, and a downwardly extending flange 154 abutting the inside of the other side wall of the associated top sheet.

The indentations 58 in the top sheets 42, 43 and 44 and in the reinforcement blanks 45 and 46 provide (see FIGS. 7 and 8) openings 158 in the side walls of the formed sheets 42, 43 and 44. The openings 158 in the formed sheet 42 (see FIG. 8) receive the ends of the formed sheets 43 and 44, and the openings 158 in the sheets 43 and 44 (see FIG. 7) are aligned with the ends of the sheet 41. Thus, the inside of each of the formed sheets 41, 42, 43 and 44 is open to the inside of the adjacent sheets. Without the indentations, the stretch in these openings would be too great and forming splits would occur.

In addition to forming the top sheets 41, 42, 43 and 44 and the reinforcement blanks 45 and 46 as described above, the first press operation also forms (see FIGS. 4, 5 and 8) punch-locks 162 between the top wall 66 of the sheet 43 and the overlapping extension 138 of the top wall 66 of the sheet 42, punch-locks 162 between top wall 66 of the sheet 44 and the overlapping extension 138 of the top wall 66 of the sheet 42, punch-locks 164 between the reinforcement blank 45, the top wall 66 of the sheet 43, and the overlapping extension 126 of the top wall 66 of the sheet 41, punch-locks 164 between the reinforcement blank 46, the top wall 66 of the sheet 44, and the overlapping extension 126 of the top wall 66 of the sheet 41, punch-locks 166 between the top wall 66 of the sheet 43 and the top wall of the reinforcement blank 45, and punch-locks 166 between the top wall 66 of the sheet 44 and the top wall of the reinforcement blank 46.

The punch-locks 162, 164 and 166 are created by respective punch-lock mechanisms 170, one of which is illustrated in FIG. 10. Such a punch-lock mechanism is known in the art and will not be described in greater detail. Suitable punch-lock mechanisms are disclosed in U.S. Pat. Nos. 3,359,935 and 3,579,809, both of which are incorporated herein by reference. In other embodiments, other securing means such as adhesives, spot welds, or other clinching shapes may be used.

In the preferred embodiment, the punch-locks are installed by mechanical or hydraulic means at the bottom of the form stroke, after the metal forming to shape is completed, but while the form tool still fixtures the parts in perfect alignment. This is done by the use of a two-stage press, as is conventionally known in the art. In addition, the second stage operation can be used to pierce holes in the frame, such as the body mount opening 47 shown in FIG. 4.

Along with being punch-locked together, adjacent members of the assembly 62 formed by the first press operation are also held together by frictional contact of the shaped overlapped portions of the members.

After the first press operation, the assembly 62 created thereby is placed in a press with a different die (not shown). This press can be either the press 14 or a different press. Also placed in the press are (see FIG. 4) four elongated sheet metal blanks 181, 182, 183 and 184 referred to hereinafter "closing sheets." The closing sheets 181, 182, 183 and 184 are located in the press in a manner similar to that in which the top sheets 41, 42, 43 and 44 were located in the press 14. The opposite ends of the closing sheet 181 partially overlap the closing sheets 183 and 184, and the closing sheet 182 partially overlaps the ends of the sheets 183 and 184. The sheets 181, 182, 183 and 184 are substantially the same size and shape as the bottoms of the formed sheets 41, 42, 43 and 44, respectively. After the closing sheets 181, 182, 183 and 184 are located in the press, the assembly 62 formed in the first press operation is placed on top of the closing sheets 181, 182, 183 and 184 so that the flanges of the formed top sheets 41, 42, 43 and 44 rest on top of the closing sheets 181, 182, 183 and 184, respectively. Pilot pins (not shown) may be used to align the assembly 62 relative to the closing sheets. The press is then closed. Closing of the two-stage press forms punch-locks 190 (see FIG. 5) between the flanges of the formed top sheets 41, 42, 43 and 44 and the closing sheets 181, 182, 183 and 184. This closes the underside of each of the formed top sheets 41, 42, 43 and 44 and creates an assembly of four elongated, box-shaped structural frame members.

After the second press operation, the assembly created thereby is taken to a final assembly fixture (not shown) where the joints between top sheets 41, 42, 43 and 44 and the joints between closing sheets are arc welded (indicated by reference numeral 192 in FIG. 5) and where brackets can be attached to the assembly. Brackets 194 and 198 are shown welded to the assembly in FIG. 5. The arc welding of the overlap joints of the formed top sheet is greatly assisted by the perfect lap fit-ups created by their coincident forming.

Figure 13:
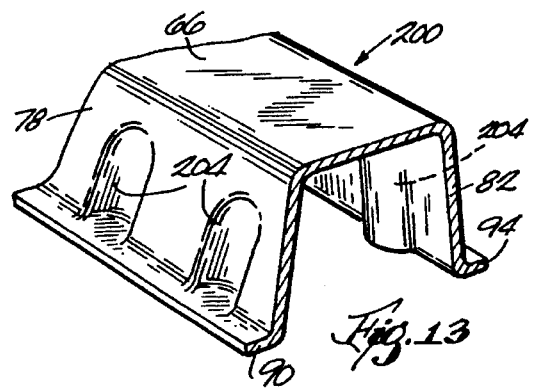
FIG. 13 is a partial perspective view of a formed blank that is part of an alternative embodiment of the invention.

A formed top sheet 200 which is an alternative embodiment of the invention is partially illustrated in FIG. 13. Except as described below, the top sheet is identical in cross-section to the top sheets 41, 42, 43 and 44, and common elements have been given the same reference numerals.

The top sheet 200 differs from the top sheets 41, 42, 43 and 44 in that each of the side walls 78 and 82 has therein spaced, indentations 204 such that the flanges 90 and 94 have sections of increased and decreased width alternately spaced along the length thereof. During the second press operation, punch-locks are formed adjacent the indentations 204. In other words, the flange sections of increased width are attached to the closing sheet.

An engine cradle 300 which is another alternative embodiment of the invention is partially illustrated in FIG. 14. The engine cradle 300 differs from the engine cradle 10 in that the engine cradle 300 includes a kicked-up portion 304. The kicked-up portion 304 is formed by providing curved, rather than planar, mating walls of the die halves used in the first and second press operations. Alternatively, in a preferred process, the blanks for both the top and bottom sheets are preformed to the same curved shape in a two stage blanking operation prior to the first press stroke.

An engine cradle 400 which is another alternative embodiment of the invention is partially illustrated in FIG. 15. The engine cradle 400 differs from the engine cradle 10 in that the structural members have a triangular cross section rather than a rectangular cross section. As shown in FIG. 15, the members 41 and 44 have side walls 78 and 82 which are connected directly to each other at their upper edges. Thus, each member has a top 404, a side wall 78 extending downwardly from the top 404, a side wall 82 extending downwardly from the top 404, a flange 90 extending outwardly from the side wall 78, and a flange 94 extending outwardly from the side wall 82. At the illustrated joint, integral extensions 122 of the side walls 78 and 82 of the member 41 are bent outwardly and overlap the side wall 78 of the member 44, integral extensions 132 of the side wall 78 of the sheet 44 are bent outwardly and extend generally perpendicular to the side wall 78 of the sheet 44 and inside the side walls 78 and 82 of the sheet 41, and integral extensions 130 of the flanges 90 and 94 of the sheet 41 overlap the flange 90 of the sheet 44.

Various features of the invention are set forth in the following claims.

We claim:

1. A method for forming a structural member, said method comprising the steps of:

placing a first sheet member having a length dimension greater than a width dimension in a die in a press, placing a second sheet member having a length dimension greater than a width dimension in said press, said second member only partially overlapping said first member, said first member only partially overlapping said second member, and the direction of the length dimension of said second mender being angled relative to the direction of the length dimension of said first member, and closing said press, thereby attaching said first member to said second member and shaping each of said first member and said second member into a non-planar shape along substantially the entire length thereof.

2. A method in accordance with claim 1 wherein said closing step shapes at least portions of said first and second members in intimate contact with each other into a shape having a top, one side wall extending downwardly from said top, and another side wall extending downwardly from said top, one flange extending outwardly from said one side wall, and another flange extending outwardly from said other side wall.

3. A method as set forth in claim 2 wherein said closing step further shapes said first and second members such that said shape has a top wall extending between said side walls.

4. A method in accordance with claim 2 wherein said attaching occurs by frictional contact of the shaped overlapped portions of said members.

5. A method in accordance with claim 2 wherein said attaching occurs by punch-locking one of said members relative to the other.

6. A method in accordance with claim 2 wherein said attaching occurs by punch-locking one of said members relative to the other and by frictional contact of the shaped overlapped portions of said members.

7. A method as set forth in claim 2 wherein said closing step also shapes said portions of said first and second members to have one flange extending outwardly from said one side wall, and another flange extending outwardly from said other side wall.

8. A method in accordance with claim 2 and further including the steps of:

placing said first and second members in a second die in a press, placing at least a third sheet member in said second die in overlapping relationship with said flanges of at least one of said first and second members, and closing said press, thereby attaching said flanges of said one of said first and second members to said third member and closing substantially all of the interior of said one of said first and second members.

9. A method in accordance with claim 8 wherein said first-mentioned closing step forms said side walls with spaced indentations such that said flanges have sections of increased and decreased width alternately spaced along the length thereof, and wherein said second-mentioned closing step attaches said flange sections of increased width to said third member.

10. A method in accordance with claim 2 wherein said closing step shapes each of said first and second sheet members into said shape along substantially the entire length thereof, and wherein said method further includes the steps of:

placing said first and second members in a second die in a press, placing first and second closing sheet members in said second die, each of said first and second closing sheet members being in overlapping relationship with said flanges of a respective one of said first and second members, and closing said press, thereby attaching each of said flanges to the respective closing sheet member closing substantially all of the interior of said first and second members.

11. A method in accordance with claim 10 wherein said first-mentioned closing step forms said side walls with spaced indentations such that said flanges have sections of increased and decreased width alternately spaced along the length thereof, and wherein said second-mentioned closing step attaches said flange sections of increased width to the respective closing sheet member.

12. A method in accordance with claim 10 and further including the steps of:

taking said structural frame to a final assembly fixture, welding at least one joint between sheet members, and attaching brackets to at least one of said sheet members.

13. A method in accordance with claim 1 wherein said closing step forms said structural member with a kicked-up portion.

14. A method in accordance with claim 1 wherein said placing steps include placing said first and second members in the press so that only end portions of said first and second members overlap.

15. A method for forming a structural member, said method comprising the steps of:

placing a first sheet member having a length dimension greater than a width dimension in a die in a press, placing a second sheet member having a length dimension greater than a width dimension in said press, said second member only partially overlapping said first member, said first member only partially overlapping said second member, and the direction of the length dimension of said second member being angled relative to the direction of the length dimension of said first member, placing a third sheet member having a length dimension greater than a width dimension in the die, said third member only partially overlapping said second member, said second member only partially overlapping said third member, and the direction of the length dimension of said third member being angled relative to the direction of the length dimension of said second member, placing a fourth sheet member having a length dimension greater than a width dimension in the die, said fourth member only partially overlapping said third member and said first member, said third member only partially overlapping said fourth member, said first member only partially overlapping said fourth member, and the direction of the length dimension of said fourth member being angled relative to the direction of the length dimension of said third member and the direction of the length dimension of said first member so that a closed opening is formed between said four sheet members, and closing said press, thereby shaping said first, second third and fourth sheet members into a non-planar shape along substantially the entire length thereof.

16. A method in accordance with claim 15 wherein said placing steps include placing said first, second, third and fourth members in the press so that only end portions of said first, second, third and fourth members overlap.

17. A method for forming a structural member, said method comprising the steps of:

placing a first sheet member having a length dimension greater than a width dimension in a die in a press, placing a second sheet member having a length dimension greater than a width dimension in said press, said second member only partially overlapping said first member, said first member only partially overlapping said second member, and the direction of the length dimension of said second member being angled relative to the direction of the length dimension of said first member, closing said press, thereby attaching said first member to said second member and shaping said first member and said second member such that at least portions of said first and second members in intimate contact with each other have a top, one side wall extending downwardly from said top, another side wall extending downwardly from said top, one flange extending outwardly from said one side wall, and another flange extending outwardly from said other side wall, placing said first and second members in a second die in a press, placing at least a third sheet member in said second die in overlapping relationship with said flanges of at least one of said first and second members, and closing said press, thereby attaching said flanges of said one of said first and second members to said third member and closing substantially all of the interior of said one of said first and second members.

18. A method in accordance with claim 17 wherein said first-mentioned closing step forms said side walls with spaced indentations such that said flanges have sections of increased and decreased width alternately spaced along the length thereof, and wherein said second-mentioned closing step attaches said flange sections of increased width to said third member.

19. A method for forming a structural member, said method comprising the steps of:

placing a first sheet member having a length dimension greater than a width dimension in a die in a press, placing a second sheet member having a length dimension greater than a width dimension in said press, said second member only partially overlapping said first member, said first member only partially overlapping said second member, and the direction of the length dimension of said second member being angled relative to the direction of the length dimension of said first member, closing said press, thereby attaching said first member to said second member and shaping said first member and said second member such that at least portions of said first and second members in intimate contact with each other have a shape having a top, one side wall extending downwardly from said top, another side wall extending downwardly from said top, one flange extending outwardly from said one side wall, and another flange extending outwardly from said other side wall, wherein said closing step shapes each of said first and second sheet members into said shape along substantially the entire length thereof, placing said first and second members in a second die in a press, placing first and second closing sheet members in said second die, each of said first and second closing sheet members being in overlapping relationship with said flanges of a respective one of said first and second members, and closing said press, thereby attaching each of said flanges to the respective closing sheet member and closing substantially all of the interior of said first and second members.

20. A method in accordance with claim 19 wherein said first-mentioned closing step forms said side walls with spaced indentations such that said flanges have sections of increased and decreased width alternately spaced along the length thereof, and wherein said second-mentioned closing step attaches said flange sections of increased width to the respective closing sheet member.

21. A method in accordance with claim 19 and further including the steps of:

taking said structural member to a final assembly fixture, welding at least one joint between sheet members, and attaching brackets to at least one of said sheet members.

22. A method for forming a structural member, said method comprising the steps of:

placing in a die in a press a first elongated sheet member having a longitudinal axis, placing in said die a second elongated sheet member having a longitudinal axis transverse to said longitudinal axis of said first member, said second member only partially overlapping said first member, said first member only partially overlapping said second member, and closing said press, thereby attaching said first member to said second member and forming each of said first member and said second member into a non-planar shape along substantially the entire length thereof.

23. A method in accordance with claim 22 wherein said closing step forms each of said first and second members into a shape along substantially the entire length thereof such that each of said members has a top, one side wall extending downwardly from said top, and another side wall extending downwardly from said top.

24. A method in accordance with claim 23 wherein said closing step forms each of said members with a top wall extending between said side walls.

25. A method as set forth in claim 24 wherein said closing step results in said top wall of said first member being punch-locked to said top wall of said second member.

26. A method as set forth in claim 23 wherein said closing step attaches said members to each other at a joint formed by integral extensions of one side wall of one of said members being bent outwardly and extending inside said side walls of the other of said members.

27. A method as set forth in claim 23 wherein said closing step attaches said members to each other at a joint formed by integral extensions of said side walls of one of said members being bent outwardly and overlapping a side wall of the other of said members.

28. A method as set forth in claim 23 wherein said closing step attaches said members to each other at a joint formed by integral extensions of one side wall of one of said members being bent outwardly and overlapping said side walls of the other of said members.

29. A method as set forth in claim 23 wherein said closing step also forms said first and second members to have one flange extending outwardly from said one side wall, and another flange extending outwardly from said other side wall.

30. A method in accordance with claim 23 and further including the steps of:

placing said first and second members in a second die in a press, placing first and second closing sheet members in said second die, each of said first and second closing sheet members being in overlapping relationship with said flanges of a respective one of said first and second members, and closing said press, thereby attaching each of said flanges to the respective closing sheet member closing substantially all of the interior of said first and second members.

31. A method in accordance with claim 22 wherein said placing steps include placing said first and second members in the press so that only end portions of said first and second members overlap.

32. A method for forming a structural member, said method comprising the steps of:

placing in a die in a press a first elongated sheet member having a longitudinal axis, placing in said die a second elongated sheet member having a longitudinal axis transverse to said longitudinal axis of said first member, said second member only partially overlapping said first member, said first member only partially overlapping said second member, closing said press, thereby attaching said first member to said second member and forming each of said first member and said second member into a shape along substantially the entire length thereof such that each of said member has a top, one side wall extending downwardly from said top, another side wall extending downwardly from said top, one flange extending outwardly from said one side wall, and another flange extending outwardly from said other side wall, placing said first and second members in a second die in a press, placing first and second closing sheet members in said second die, each of said first and second closing sheet members being in overlapping relationship with said flanges of a respective one of said first and second members, and closing said press, thereby attaching each of said flanges to the respective closing sheet member and closing substantially all of the interior of said first and second members.

33. A method for forming a structural member, said method comprising the steps of:

placing in a press first and second sheet members, said second member only partially overlapping said first member, said first member only partially overlapping said second member, and closing said press, thereby securing said second member to said first member, forming said first member into a shape along substantially the entire length thereof such that said first member has a top, one side wall extending downwardly from said top, and another side wall extending downwardly from said top, and forming said second member into a non-planar shape along substantially the entire length thereof.

34. A method as set forth in claim 33 wherein said closing step forms said first member so as to have a top wall extending between said side walls.

35. A method as set forth in claim 33 wherein said closing step forms said first member so as to have one flange extending outwardly from said one side wall, and another flange extending outwardly from said other side wall.

36. A method in accordance with claim 35 and further including the steps of:

placing said first and second members in a second die in a press, placing a closing sheet member in said second die, said closing sheet member being in overlapping relationship with said flanges of said first mender, and closing said press, thereby attaching each of said flanges of said first member to said closing sheet member and closing substantially all of the interior of said first member.

37. A method in accordance with claim 33 wherein said placing steps include placing said first and second members in the press so that only end portions of said first and second members overlap.

38. A method for forming a structural member, said method comprising the steps of:

placing in a press first and second sheet members, said second member only partially overlapping said first member, said first member only partially overlapping said second member, closing said press, thereby securing said second member to said first member and forming at least said first member into a shape along substantially the entire length thereof such that said first member has a top, one side wall extending downwardly from said top, another side wall extending downwardly from said top, one flange extending outwardly from said one side wall., and another flange extending outwardly from said other side wall, placing said first and second members in a second die in a press, placing a closing sheet member in said second die, said closing sheet member being in overlapping relationship with said flanges of said first member, and closing said press, thereby attaching each of said flanges of said first member to said closing sheet member and closing substantially all of the interior of said first member.

* * * * *